Figure 1:
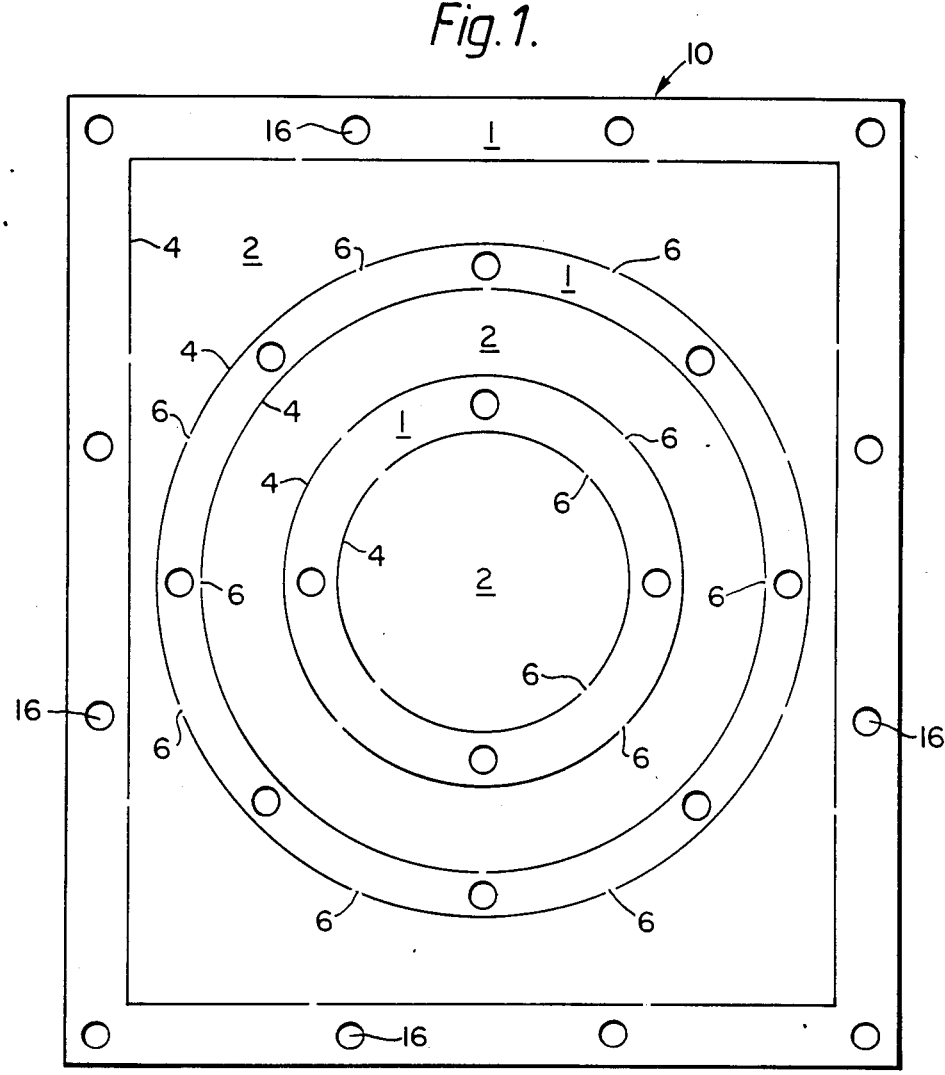

United States Patent [19]
Adkins

[11] Patent Number: 4,690,413
[45] Date of Patent: Sep. 1, 1987

[54] GASKETS

[75] Inventor: Ernest Adkins, Hildenborough, England

[73] Assignee: Klinger AG, Zug, Switzerland

[21] Appl. No.: 772,153

[22] Filed: Sep. 3, 1985

[30] Foreign Application Priority Data

Sep. 3, 1984 [GB] United Kingdom ............... 8422193

[51] Int. Cl.⁴ .................... B65D 73/00; F16J 15/00
[52] U.S. Cl. .................... 277/199; 206/223; 277/192; 277/DIG. 10; 428/43
[58] Field of Search ............ 277/237 R, 199, 192, 277/220, 221, 222, DIG. 10; 446/127, 125; 273/156, 157 R; 428/43; 33/563, 562, 565, 1 G, 1 E; 206/223, 582, 820

[56] References Cited

U.S. PATENT DOCUMENTS

| | | | |
|---|---|---|---|
| 750,534 | 1/1904 | George | 277/199 X |
| 1,261,133 | 4/1918 | Kidd | 428/43 X |
| 1,958,829 | 5/1934 | Lewin, Jr. | 428/43 |
| 2,347,561 | 4/1944 | Howard et al. | 428/43 X |
| 2,395,312 | 2/1946 | Barnes | 273/157 R |
| 3,010,723 | 11/1961 | Moss | 273/157 R |
| 3,575,418 | 4/1971 | Palmer | 273/157 R |
| 3,583,711 | 6/1971 | Engleman | 277/199 |
| 3,738,670 | 6/1973 | Jelinek et al. | 277/199 |
| 4,500,580 | 2/1985 | Luciani | 428/43 |

FOREIGN PATENT DOCUMENTS

| | | |
|---|---|---|
| 3139680 | 4/1983 | Fed. Rep. of Germany . |
| 684106 | 6/1930 | France ............ 277/DIG. 10 |
| 208927 | 12/1981 | German Democratic Rep. . |
| 308840 | 2/1969 | Sweden ............... 277/199 |
| 1412141 | 10/1975 | United Kingdom . |
| 1541690 | 3/1979 | United Kingdom . |

Primary Examiner—Allan N. Shoap
Attorney, Agent, or Firm—Abelman Frayne Rezac & Schwab

[57] ABSTRACT

A kit of gaskets comprises at least one piece (10) of gasket forming material, preferably of the "dry joint" grade, which piece includes gasket parts (1) and packaging parts (2). Cuts (4) separate the gasket parts (1) from the packaging parts (2). The cuts (4) do not extend around the gasket peripheries but terminate so as to define interconnecting regions (6). At least two of the gasket parts may define segments (14, 16) each having a dovetail projection (12) or recess (14) adapted for engagement with one another. The bolt holes are formed by removing the pips of material from the piece.

6 Claims, 4 Drawing Figures

GASKETS

This invention relates to gaskets, and in particular to a gasket kit for building, overhauling or rebuilding an engine such as an automotive engine.

On overhauling the top and/or bottom part of an automotive engine, a plurality of gaskets needs to be replaced and kits of gaskets known as "top kits" and "bottom kits" are available for this purpose. Top kits usually include the cylinder head gasket and bottom kits usually include large sump and timing case cover gaskets etc.

It is known, in the manufacture of gaskets to press them out of a sheet of material. For example, GB-A-1541690 describes a single gasket for use between a thermostat housing and a mounting surface in which "push out" areas of gasket material are left in place for the user to select areas which he wishes to push out and which he wishes to retain in dependence upon the particular model of thermostat which is to accommodate the gasket.

However, the user must always retain some push out parts in the gasket for use, which push out parts will be relatively loosely held and tend to weaken the gasket.

It is also known that, to allow the use of different materials in a single gasket, segments of gaskets may be cut from different sheets and thereafter joined together, for example, by utilising dovetail end portions of the gasket segments provided for the purpose (see GB-A-1412141). In such cases, a sealing compound is used to effect adhesion of the segments to one another on assembly of the gasket.

Apart from the abovementioned kits for building or overhauling an automotive engine, a user often requires a plurality of different size gaskets for different purposes.

In the past, difficulties have arisen when attempting to package and transport a kit comprising a plurality of gaskets. For example, the larger gaskets are folded around corrugated paper and smaller gaskets are generally left loose in a box. Serious problems have been experienced due to damaged gaskets performing unsatisfactorily. The damage was traced to cracking along the folded line of the large gaskets and general distortion/tearing of the smaller, loose gaskets. Furthermore, problems have been caused by loss of gaskets, especially the smaller gaskets, for example after a package has been damaged.

It is known from DE-A-No. 3139680 to provide a plurality of annular rubber rings which nest concentrically within one another and which are held together by rubber strips extending radially across the strips and across the gaps therebetween, the strips standing proud of one surface of the rings. However, the formation of such an arrangement requires a complicated moulding technique, and is limited to mouldable materials. Furthermore, removal of any unwanted strip material would appear to be difficult.

The present invention provides a kit of gaskets, the construction of which minimises the risk of the abovementioned damage of the gaaskets during packaging, transport and handling etc.

The invention provides a kit of gaskets comprising at least one piece of gasket material, which piece comprises (1) a plurality of gasket parts and (2) a plurality of parts serving as packaging material, the respective parts (1) and (2) being defined by cuts which extend at least partially into the piece and along respective peripheries of the gasket parts but which terminate so as to retain interconnecting regions securing the gasket parts in position in the piece, so that the user may readily separate the gasket parts (1) from the packaging parts (2) of the piece, for example by merely pressing out the gasket parts from the piece. Thus the user may select and press out any gasket part at will, while leaving the remaining parts within the piece.

A gasket kit, for example for use as a "bottom kit" or "top kit", may comprise a plurality, for example three, pieces which together contain all the gaskets required.

In a preferred embodiment of the invention, the cuts extend completely through the piece and along substantial lengths of the respective peripheries of the gasket parts, but do not extend completely around the gasket-forming parts; they terminate so as to provide the interconnecting regions securing the gasket-forming parts in position in the piece. The user need merely break the piece at the interconnecting regions, for example, by pressing out the gasket parts (1) or packaging parts (2) from the piece. This embodiment is especially preferred because it enables a plurality of webs of gasket material stacked one on top of the other to be cut simultaneously by a single tool in a single cutting operation to provide at once a plurality of pieces for kits embodying the invention.

The interconnecting regions are preferably spaced apart uniformly around the peripheral regions of the gasket parts. However, an especially preferred arrangement of interconnecting regions comprises at least a first set of interconnecting regions spaced part from one another and a second set of interconnecting regions arranged in pairs, the interconnecting regions of the second set each being of a length smaller than those of the first set, the first set of interconnecting regions serving to secure the gasket parts in position within the piece and the second set of interconnecting regions serving to minimise sagging of the gasket parts out of the plane of the piece during handling, transportation etc.

The interconnecting regions formed by termination of the abovementioned cuts may themselves have partial cuts therein defining lines of weakening to facilitate removal of the gasket parts from the piece by the user, or alternatively, partial cuts around the entire peripheries of the gasket parts may divide the gasket parts from the packaging parts, which partial cuts terminate short of the interconnecting regions thereunder and provide lines of weakening again facilitating removal of the gasket parts from the piece. However, these embodiments having partial cuts are less preferred because they require particularly accurate machining of the cutting tool and because they must be cut individually; i.e. they cannot be formed by cutting a plurality of webs at once with a given cutting tool.

In a particularly preferred kit of gaskets embodying the invention, the larger gaskets are provided by at least two gasket parts defined by the said cuts which gasket parts provide respective gasket segments. The segments are each profiled at their respective ends so as to provide interengaging members allowing a complete gasket to be made up by joining the gasket segments together. The smaller gasket may each be defined by a respective single gasket part.

With such pieces embodying the invention, the packaging parts serve to retain the gasket parts in position so that they are not left loose in a box during transport, thus minimising damage thereof. Furthermore, the provision of relatively smaller gasket parts which can be interconnected by the user to provide larger gaskets eliminates the need for folding of the gaskets so avoiding cracking along the folding lines. In a preferred kit embodying the invention as many gaskets as possible, including the abovementioned gasket parts may be nested within a single piece, and preferably within one another thus providing a particularly efficient utilisation of material.

Some of the cuts defining each gasket part will define apertures of the gasket such as throughflow apertures and bold holes. The sheet material present in those regions of the piece which are to provide the smaller holes, such as bolt hole pips or even throughflow apertures of smaller diameter gaskets is preferably removed during manufacture of the kit, or at least prior to packaging to minimise the work of the end user and reduce possible handling damage and losses. It is especially preferred to remove the bold hole pips during manufacture of the kits because failure by a user to remove a bolt hole pip before use of the gasket in assembly of an automotive engine may result in gasket failure, or even engine failure should the pip find its way into an oil or water passage.

The or each piece of a gasket kit embodying the invention is preferably a single, unitary layer of gasket material, though this unitary layer may itself be a single ply layer or a multi-ply laminate.

A typical sheet thickness is from 0.5 to 1.5 mm, especially 0.8 mm.

The gasket material may be any of a variety of jointing materials such as a cork/rubber mixture, paper or compressed mineral or synthetic fibers, for example, asbestos, aramids etc.

However, it is preferred to employ gasket materials of a so-called "dry joint" grade. These materils have, to date, found particular use in "OE" (original equipment) building of e.g. automotive engines. Gaskets of such materials can be employed without the need to apply sealing compounds to them. Typical "dry joint" grade materials are Klinger WB1 (an asbestos/rubber single ply controlled swell material), Klingerflex 2CA (a three-ply sandwich of a high quality controlled swell material between layers each of cork/asbestos/rubber), Klinger 41 (a single ply high grade nitrile rubber/asbestos material) and Klinger CB1 (a single ply cork/asbestos controlled swell material). Gasket materials which comprise controlled swell materials allow absorption of oil into them and thereby swell to give improved sealing properties. These are especially preferred.

When using such "dry joint" grade materials, the relatively higher base material costs are more than offset by the improvement in utilisation resulting from rationalisation of material type and thickness.

It was thought previously impossible to provide a satisfactory kit of gasket parts in which the gasket was sufficiently well secured within a piece to be retained in the piece during transportation and handling etc, and yet be sufficiently easy to remove from the piece without the risk of damaging the gasket during its removal. Surprisingly, we have found that this can be achieved, especially with the abovementioned dry joint materials.

We find that this balance between durability during handling and ease of removal of the gasket parts for use is excellent when the arrangement of interconnecting regions comprising at least two sets thereof as previously described is employed with a dry joint material as also described above.

Gasket kits embodying the invention can be manufactured by a press cutting machine including a cutting tool suitably profiled so as to cut through the gasket material to provide the desired gasket profile, the cutting edge of the cutting tool being provided with niches which are of a depth such that the material in certain regions remains either completely uncut or only partially cut to provide interconnecting regions securing the gasket forming parts in position in the piece.

It is especially preferred that the cutting tool includes "straight through" punches for removing bolt hole pips.

Thus, in accordance with another aspect of the invention there is provided a cutting tool for a press for manufacturing a gasekt ket as described above, which tool comprises a supporting platen having protruding therefrom (a) a profiled cutting member capable of providing cuts defining the profile of a gasket part, the cutting edge of the cutting member having a plurality of niches therein to provide the interconnecting regions and preferably additionally (b) a plurality of punches for punching out respective bolt hole pips, the supporting platen then being provided with a plurality of apertures therethrough, which apertures receive respective said punches and are preferably connected to a air blast source to aid removal of the said bolt hole pips after cutting out thereof.

Such a tool may be fitted with releasable fastening members so that it can easily be removed from the press head and replaced by another tool whenever required.

Figure 2:
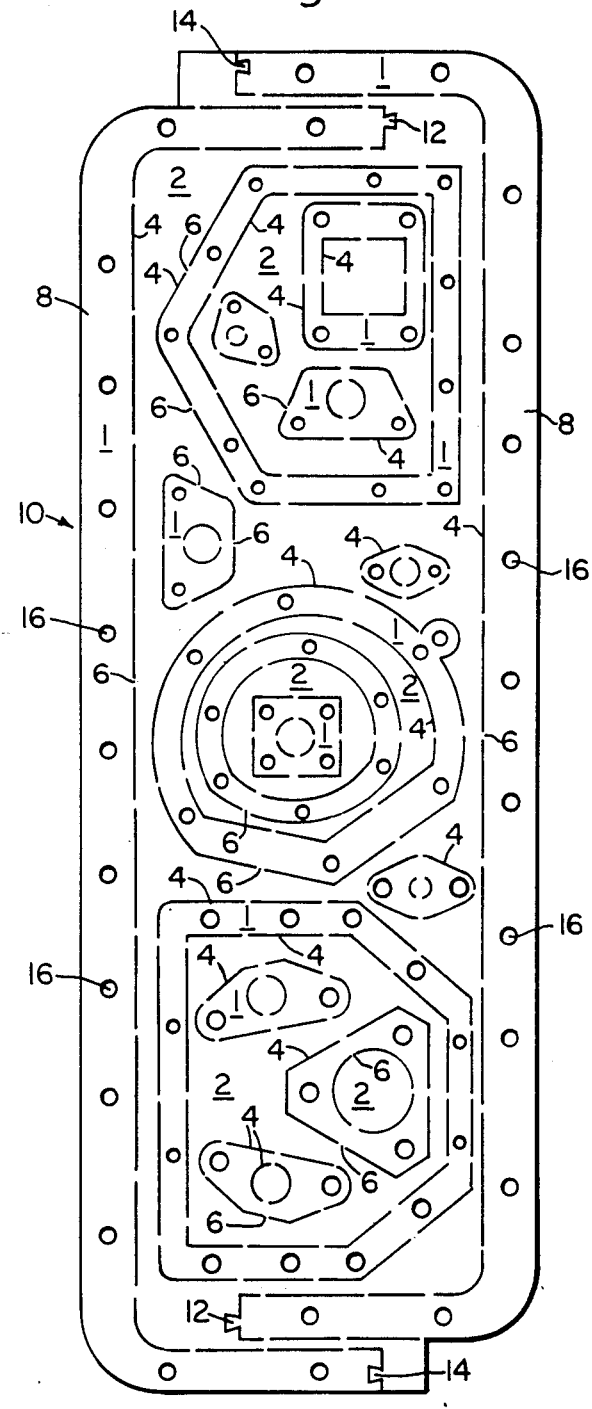
Figure 3:
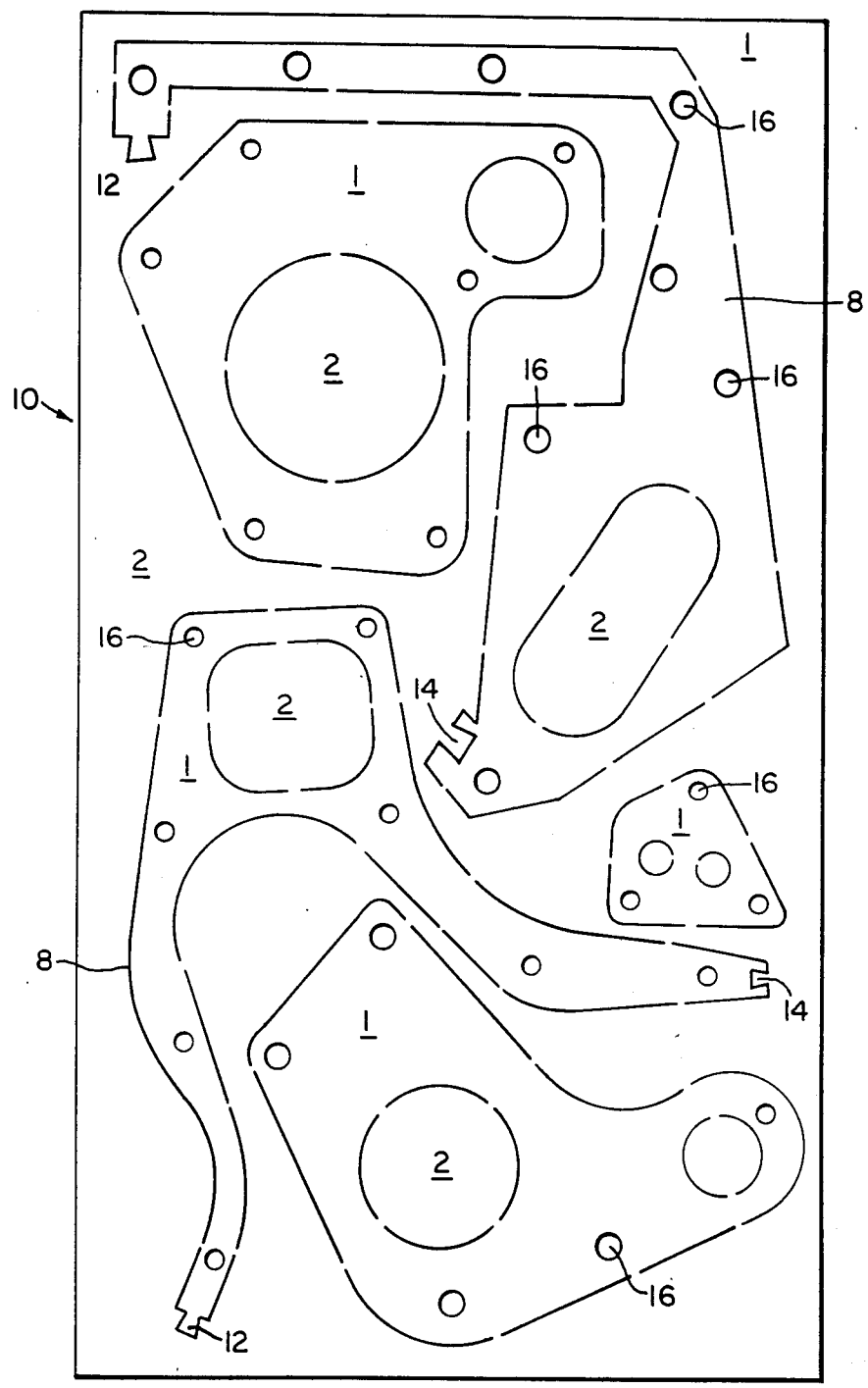
Figure 4:
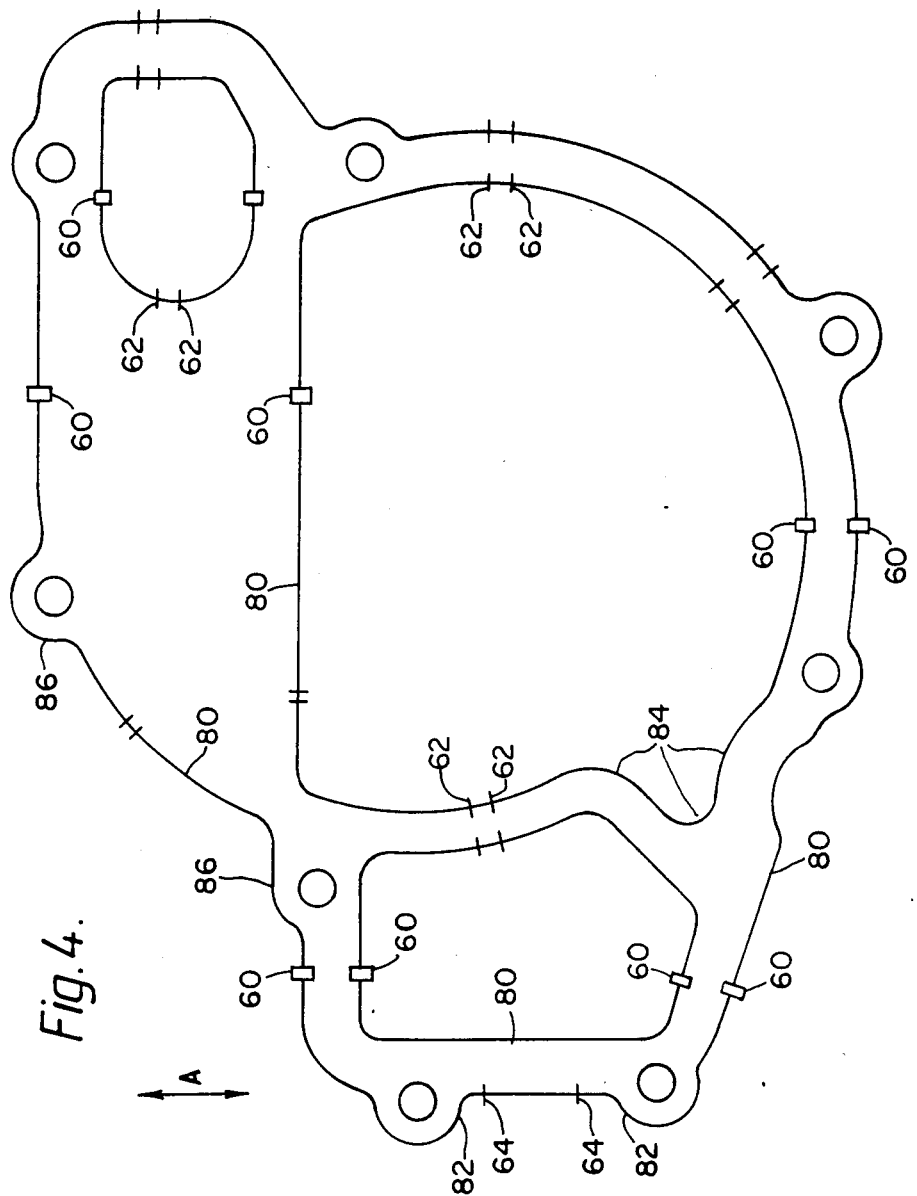

A preferred "no-fold" gasket kit embodying the invention which is especially useful as a "bottom kit" for use in overhauling the bottom part of an automotive engine, and a cutting tool for providing a preferred arrangement of interconnecting regions in piece of gasket material (though for ease of illustration, the contains only a single gasket part) will now be described with reference to the accompanying drawings, in which:

FIG. 1 shows a first piece of the kit, which piece contains essentially annular gaskets nested one within the other, FIG. 2 shows a second piece of the kit, FIG. 3 shows a third piece of the kit, and FIG. 4 shows a schematic plan view of a cutting tool for providing a piece having a preferred arrangement of interconnecting regions.

Each of the pieces shown in FIGS. 1–3 comprises a unitary piece 10 of gasket-forming material, preferably "dry joint" material which piece includes gasket parts 1 and packaging parts 2. Cuts 4 extending completely through the piece separate the gasket parts 1 from the packaging parts 2. The cuts 4 do not extend completely around either the inner or the outer periphery of the gasket parts 1, but terminate so as to define interconnecting regions 6. Lines of weakening (not shown) may be provided at these interconnecting region 6 which lines of weakening are formed by only partially cutting the material in these regions. The gasket parts 1 are thus an integral part of the piece 10.

The interconnecting regions 6 are spaced apart uniformly around the peripheral regions of the gasket parts 1. They should occupy only a small proportion of the total periphery of the gasket parts, say 3–4%. They are preferably of a constant length, say from 0.5 to 2 mm e.g. 1 mm, long. The larger the gasket part, the greater is the number of interconnecting regions 6 provided. A particularly preferred arrangement of interconnecting regions of differing lengths is described in more detail below with reference to FIG. 4.

The embodiments shown in FIGS. 2 and 3 each additionally include segments 8 each of which defines only a part of a larger gasket. Each segment has, at each opposite end, a dovetail projection 12 or a recess 14, which projections and recesses 12 and 14 are adapted for interengagement with one another so that the user may assemble a complete gasket. A particularly secure engagement of the gasket segments within the piece, yet with easy release from the piece and efficient assembly of the gasket segments to form a gasket, is achieved if the corners of the dovetail projections and recesses are rounded.

The user need merely break the piece at the interconnecting regions 6 by pressing out the gasket parts 1 and segments 8 from the piece and join the segments 8 together by means of the dovetail projections 12 and recesses 14. Where the gasket material is a "dry joint" material, adhesive need not, and indeed should not, be used in joining the gasket segments together.

Each of the pieces of FIGS. 1-3 has bolt holes 16 therein which are formed by cutting out and removing bolt hole pips during manufacture of the piece. This saves the user unnecessary trouble and avoids the danger that the user may fail to remove a bolt hole pip; the presence of a bolt hole pip in a gasket may, in assembly of an engine, cause gasket or engine failure.

Similarly, for the smaller gaskets, throughflow apertures may be performed by removing parts of the sheeting during manufacture.

The kits shown in FIGS. 1-3 are each manufactured by inserting sheeting of gasket material in a press provided with a profiled cutting tool.

A typical press for manufacturing a kit of gaskets embodying the invention will now be described in more detail.

The press comprises a base of a relatively soft material, onto which sheet of gasket material is fed, and a press head carrying a cutting tool. On operating the press, the press head will descend so that the cutting tool cuts out from the sheet piece such as any of those shown in FIGS. 1-3, which comprises, say, one of the pieces of a kit of gaskets.

Alternatively, a plurality of sheets are stacked one above the other, in which case a plurality of pieces of a given profile will be produced by the one cutting operation. In practice the machine may take up to 10 sheets. It will, for example, take 4 sheets each of a thickness of 0.8 mm.

After the first cutting operation, the press head then rises, moves to another position above the sheet and then descends to stamp out another piece or pieces of the same profile as the first piece.

The press is sufficiently large to accommodate sheets of gasket material up to 4 m × 1½ m and a typical cutting tool will have a diameter up to about 1 m.

After each cutting operation the base is preferably actuated slightly to provide movement thereof in two directions at once so that a subsequent cutting operation in the same general region of the base takes place at a slightly different place on the base. This minimizes deformation and damage of the base material by the cutting tool and provides cleaner, more accurate cuts and avoids the formation of fibrous edges.

The press head is a so-called "cross head" which moves laterally across the web after each cutting operation. In addition to this lateral movement, the press head is also capable of rotation and by this means a particularly close nesting of respective pieces cut out of a given sheet may be achieved to give an interlocked design of pieces in the sheet, thus providing particularly efficient utilization of material. Translation and rotation of the press head may be computer controlled so as to allow movement of the cutting tool carried thereby to those successive positions which provide the most efficient material utilization.

The cutting tool comprises a wooden, plastics or metal platen into which is embedded a plurality of cutting members having cutting edges protruding from a face of the platen. The cutting members each resemble a steel rule protruding edgewise from the platen. Each of the cutting members has a cutting edge which is profiled so as to define, on cutting, a peripheral edge of a gasket part.

The desired profiles and positions of the cutting members relative to one another which provide the most efficient material utilization can be ascertained with the aid of a visual display unit and the formation of recesses in the platen for insertion therein of the cutting members can be computer controlled.

The cutting edges each have notches therein which are of a depth such that, when the cutting edge has passed completely through the sheets of gasket materials to provide the cuts 4, the base of the notch rests on or above the sheet so as not to cut it, thus leaving uncut the interconnecting regions 6. Particularly deep notches are provided when cutting of a plurality of sheets simultaneously is contemplated. Alternatively, when cutting only a single sheet, the notches may be of a depth such that the base of the notch cuts through a part of the thickness of the sheet providing lines of weakening in the interconnecting regions 6.

The platen additionally has apertures therein each of which carries a "straight through" punch for stamping out bolt hole pips from the web of gasket material. These punches may be of any selected standard size and, on operation of the press, cut through the gasket material completely. Each of the apertures is connected to a high pressure air source which removes the bolt hole pips cut out from the sheet of gasket material so as to efficiently remove them.

The cutting tool is releasably secured to the press head so that it can be easily removed to allow rapid change of the cutting tool.

After cutting out pieces of a given profile which are each to provide a first piece of each of respective kits of gaskets such as that shown in FIG. 1, the tool can be changed to provide pieces of a different profile such as a second piece of each of respective kits as shown in FIG. 2, and so on.

A kit of gaskets embodying the invention may contain up to 150 gaskets most of which are of different respective profiles and yet are secured within only a few different pieces.

In addition to the abovementioned pieces of gaskets, conventional molded rubber "O" seals and other sealing materials required for the automotive engine may of course be provided in a package including a kit of gaskets.

A "no-fold" kit embodying the invention is particularly simple to manufacture, especially with the cutting equipment described above, allows high utilization of gasket material, enables packaging, transportation and handling of the gaskets without damage such as cracking along fold lines or general distortion/tearing and provides a display of gaskets which allows the user to readily select the required gasket for a particular task.

Since the gaskets are securely held within the pieces of the no-fold kit, the possibility of losing the smaller gaskets, for example, on damage of a package containing the kit, is eliminated.

A particularly preferred arrangement of interconnecting regions of a pieces of gasket material is provided by a cutting tool part shown schematically in FIG. 4, though for ease of illustration, the tool part shown is designed to provided only a single gasket part and the tool part which stamps the piece of gasket material containing the gasket part out of a sheet of material has been omitted for clarity. Since the piece contains only one gasket part, it is outside the invention.

On stamping a sheet of gasket material with the tool so that the blades 80 thereof pass through the sheet, interconnecting regions are left in the piece by virtue of the presence of notches 60, 62 and 64 in the tool blades 80.

The disposition of the interconnection regions relative to the grain of the gasket material to be cut can be seen by reference to the arrow A which represents the direction of grain of the material.

The notches 60 are relatively large, singly arranged notches, typically about 1.5–2 mm in length. They are each spaced apart from one another essentially uniformly, preferably about 100 mm apart along the blades 80 and are disposed so that the interconnecting regions formed thereby extend generally across the grain of the sheet material at key stress areas so as to impart greater strength to the interconnecting regions, which are therefore unlikely to break easily during handling. The notches 60 are also arranged, where possible, in line with one another to enable the provision of interconnecting regions parallel to the direction of pull to be exerted by an operator when picking up gasket pieces to separate multiple layers thereof.

The notches 62 are small double notches, i.e. arranged in pairs along the blades 80 so as to provide pairs of interconnecting regions for mutual strength around the peripheries of the gasket parts. These subsidiary notches 62 are shorter in length than the notches 60 and are typically about 0.8–1 mm in length. Each notch 62 of its pairs is typically separated from the other by about 5–10 mm and each pair of notches 62 is typically separated one from the other by about 75–100 mm. They are disposed so as to enable formation of interconnecting regions with or at an angle to the grain of the sheet material, which interconnecting regions are particularly easy for the user to snap when removing a gasket.

The notches 64 are small, singly arranged notches, typically of a length of about 0.8–1 mm disposed as and where convenient, especially to provide interconnecting regions on the lesser lengths of the peripheral edges of the gasket parts, and preferably near to fillet radii 82 of the blades 80.

The notches 60 provide interconnecting parts which serve mainly to secure the gasket parts in position within the sheet 10, while the notches 62 and 64 provide interconnecting regions which serve mainly to prevent the gaskets from flopping on handling, which might otherwise lead to a gasket being inadvertently torn out of the web on handling.

The number, size and distribution of the notches 60, 62 and 64 depends upon the type and thickness of the material to be cut, the required profile of the gaskets in the piece and the number of gasket sheets to be cut in the one cutting operation.

In any event it is preferred to leave all sharp corners 84 and bolt hole boss forming parts 86 face from notches.

All notches 60, 62, 64 are preferably of the same depth, typically about 3–4 mm.

I claim:

1. A kit of gaskets comprising at least one web of dry joint grade gasket material, which web comprises (1) a plurality of gasket parts and (2) a plurality of parts serving as packaging material, the respective parts (1) and (2) being defined by cuts which extend completely through the web and along respective peripheries of the gasket parts but which cuts terminate so as to retain interconnecting regions securing the gasket parts in position in the web, whereby the gasket parts are capable of being pushed out of the web and thereby separated therefrom, at least two of the gasket parts defining respective gasket segments, each segment being profiled at each end thereof to provide interengaging members for enabling assembly of the gasket segments, after being pushed out from the web into a gasket, and each segment, when retained in the web, being disposed so that respective end portions of respective gasket segments are in generally overlapping relationship so as to define a region of the web generally surrounded by the gasket segments, the remaining gasket parts being present within the said region of the web and at least some of the remaining gasket parts nesting essentially within one another.

2. A kit according to claim 1, wherein the interconnecting regions extend along about 3–4% of the total periphery of the gasket parts.

3. A kit according to claim 1, wherein the interconnecting regions are each of a length of from about 0.5 to 2 mm.

4. A kit according to claim 1, wherein the interengaging members are each selected from dovetail projections and recesses.

5. A kit according to claim 1, wherein the thickness of the gasket material is from about 0.5 to 1.5 mm.

6. A kit according to claim 1, which includes, in at least one piece thereof, bolt-hole defining apertures free from gasket material.

* * * * *